US012292810B2

(12) United States Patent
Li

(10) Patent No.: US 12,292,810 B2
(45) Date of Patent: May 6, 2025

(54) SERVICE ANOMALY REMINDING METHOD, ELECTRONIC DEVICE, AND STORAGE MEDIUM

(71) Applicant: Honor Device Co., Ltd., Shenzhen (CN)

(72) Inventor: Dan Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/273,275

(22) PCT Filed: Dec. 14, 2022

(86) PCT No.: PCT/CN2022/139109
§ 371 (c)(1),
(2) Date: Jul. 20, 2023

(87) PCT Pub. No.: WO2023/130931
PCT Pub. Date: Jul. 13, 2023

(65) Prior Publication Data
US 2024/0311265 A1   Sep. 19, 2024

(30) Foreign Application Priority Data

Jan. 10, 2022   (CN) .......................... 202210022190.1

(51) Int. Cl.
*G06F 3/0484*   (2022.01)
*G06F 11/32*   (2006.01)

(52) U.S. Cl.
CPC .......... *G06F 11/324* (2013.01); *G06F 3/0484* (2013.01)

(58) Field of Classification Search
CPC ........ G06F 3/14; G06F 16/9537; G06F 9/448; G06F 9/52; G06F 3/0481; G06F 11/32;
(Continued)

(56) References Cited

U.S. PATENT DOCUMENTS 9,686,386 B1 * 6/2017 Kubasik ............ H04M 1/72457
10,089,365 B1   10/2018 Khanna et al.
(Continued)

FOREIGN PATENT DOCUMENTS

| CN | 111182145 A | 5/2020 |
|----|-------------|--------|
| CN | 112241867 A | 1/2021 |

(Continued)

*Primary Examiner* — Rayeez R Chowdhury
(74) *Attorney, Agent, or Firm* — Leydig, Voit & Mayer, Ltd.

(57) ABSTRACT

This application provides a service anomaly reminding method, an electronic device, and a storage medium, and relates to the field of intelligent electronic devices. The method includes: receiving a first message; parsing the first message to determine whether the first message includes travel information; if the first message includes the travel information, determining whether a desktop card exists on a display interface of the electronic device; and if no desktop card exists on the display interface of the electronic device, displaying guide information, where the guide information is used for guiding a user to add the desktop card. By the embodiments of this application, the user can be reminded when a scenario intelligent service is abnormal in a travel process, so that the user adjusts the scenario intelligent service, thereby improving the efficiency of travel reminding.

16 Claims, 11 Drawing Sheets

(58) Field of Classification Search
CPC ....... G06F 3/0484; B42D 15/02; B42D 15/04;
G06Q 40/02; G06Q 10/02; G06Q 10/047;
G06Q 10/06; G06Q 10/08; G06Q 10/10;
G06Q 40/03; G06Q 50/12; G06Q 50/14
See application file for complete search history.

(56) References Cited

U.S. PATENT DOCUMENTS

| | | | |
|---|---|---|---|
| 10,313,505 B2* | 6/2019 | Omernick | G06F 3/04886 |
| 2006/0277469 A1* | 12/2006 | Chaudhri | G06F 8/61 |
| | | | 715/709 |
| 2021/0018958 A1 | 1/2021 | Xia et al. | |
| 2021/0166305 A1* | 6/2021 | Tateishi | G06Q 50/10 |
| 2022/0366327 A1* | 11/2022 | Xiang | H04W 8/205 |
| 2022/0406422 A1* | 12/2022 | Crowley | G06Q 20/36 |
| 2024/0103888 A1 | 3/2024 | Ding et al. | |
| 2024/0134491 A1* | 4/2024 | Yang | G06F 3/0482 |
| 2024/0311265 A1* | 9/2024 | Li | G06F 3/0484 |

FOREIGN PATENT DOCUMENTS

| | | | |
|---|---|---|---|
| CN | 112815955 A | 5/2021 | |
| CN | 112861027 A | 5/2021 | |
| CN | 113163394 A | 7/2021 | |
| CN | 113722027 A | 11/2021 | |
| CN | 113722028 A | 11/2021 | |
| WO | 2021244154 A1 | 12/2021 | |

\* cited by examiner

SERVICE ANOMALY REMINDING METHOD, ELECTRONIC DEVICE, AND STORAGE MEDIUM

CROSS-REFERENCE TO RELATED APPLICATIONS

This application is a national stage of International Application No. PCT/CN2022/139109, filed on Dec. 14, 2022, which claims priority to Chinese Patent Application No. 202210022190.1, filed on Jan. 10, 2022. The disclosures of both of the aforementioned applications are hereby incorporated by reference in their entireties.

TECHNICAL FIELD

This application relates to the technical field of intelligent electronic devices, and in particular, to a service anomaly reminding method, an electronic device, and a storage medium.

BACKGROUND

In the face of complicated life and work, only by properly arranging the schedule, twice the result with half the effort can be achieved. At present, the scenario intelligent service of an electronic device has become a good helper for people's daily life schedule, which greatly facilitates the use by users. Through the scenario intelligent service, corresponding travel service cards can be automatically generated by identifying travel messages of flights, trains, or the like corresponding to a user of the electronic device, and the generated travel service cards are collectively displayed on a particular interface, so as to facilitate quick browsing and management by the user.

However, if the electronic device does not display a desktop card by default and the user has difficulties in conveniently finding a card addition entrance, the corresponding travel service cards cannot be displayed on the electronic device in a timely manner, which causes that the user cannot enjoy the scenario intelligent service in a travel process. In addition, if the user mistakenly deletes the desktop card, the user cannot enjoy the scenario intelligent service in the travel process either.

SUMMARY

In view of the foregoing content, it is necessary to provide a service anomaly reminding method, an electronic device, and a storage medium, for reminding a user when a scenario intelligent service is abnormal in a travel process, so that the user adjusts the scenario intelligent service, thereby improving the efficiency of travel reminding.

In a first aspect, an embodiment of this application provides a service anomaly reminding method, applicable to an electronic device. The method includes: receiving a first message: parsing the first message to determine whether the first message includes travel information: if the first message includes the travel information, determining whether a desktop card exists on a display interface of the electronic device; and if no desktop card exists on the display interface of the electronic device, displaying guide information, where the guide information is used for guiding a user to add the desktop card. Through the technical solution, a user can be reminded when a scenario intelligent service is abnormal in a travel process, so that the user adjusts the scenario intelligent service in a timely manner and that a travel service card is normally displayed on the electronic device, thereby improving the timeliness of travel reminding.

In an implementation, the parsing the first message to determine whether the first message includes travel information includes: parsing the first message to determine a message type of the first message; and determining, based on the message type, whether the first message includes the travel information. Through the technical solution, content in a message can be accurately identified based on a type of the message, and determining whether the message includes travel information can be effectively improved.

In an implementation, if no desktop card exists on the display interface of the electronic device, before displaying the guide information, the method further includes: if no desktop card exists on the display interface of the electronic device, generating the guide information. Through the technical solution, information for guiding the user to enable the travel service card can be generated, thereby improving the timeliness of travel reminding.

In an implementation, if no desktop card exists on the display interface of the electronic device, the generating the guide information includes: if no desktop card exists on the display interface of the electronic device, determining travel information corresponding to the first message; and generating the guide information based on the travel information. Through the technical solution, the guide information can be enabled to include the travel information, so that the user can intuitively experience the content and benefits of the scenario intelligent service in a travel process, thereby improving the efficiency of service anomaly reminding.

In an implementation, the determining travel information corresponding to the first message includes: parsing the first message to determine the travel information corresponding to the first message. Through the technical solution, the travel information in the first message can be extracted, thereby facilitating subsequent generation of a travel card.

In an implementation, the determining travel information corresponding to the first message includes: determining a sender corresponding to the first message; and performing data exchange with the sender to determine the travel information corresponding to the first message. Through the technical solution, data exchange is performed with the sender to determine sent content, so that the accuracy of determining the travel information can be improved.

In an implementation, if no desktop card exists on the display interface of the electronic device, the displaying the guide information includes: obtaining a display moment of a previous time of displaying the guide information: determining, based on the display moment of the previous time of displaying the guide information, a target display moment of this time of displaying the guide information; and displaying the guide information based on the target display moment. Through the technical solution, the number of times of displaying the guide information can be reduced, and disturbance to the user caused by frequent displaying of the guide information can be avoided.

In an implementation, the determining, based on the display moment of the previous time of displaying the guide information, a target display moment of this time of displaying the guide information includes: determining a cumulative number of times of displaying the guide information; and determining, based on the display moment of the previous time of displaying the guide information and the cumulative number of times of displaying the guide information, the target display moment of this time of displaying the guide information. Through the technical solution, by recording the display moment of the previous time of displaying the guide information and the cumulative number of times of displaying the guide information, a preset interval duration can be determined, to further determine the moment of this time of displaying the guide information, thereby avoiding disturbance to the user caused by frequent displaying of the guide information.

In an implementation, after determining the target display moment of this time of displaying the guide information, the method further includes: recording the display moment of this time of displaying the guide information, and updating the cumulative number of times of displaying the guide information. Through the technical solution, subsequent determining of the display moment of displaying the guide information can be facilitated, thereby improving the accuracy of determining the display moment.

In an implementation, after displaying the guide information, the method further includes: generating and displaying a travel service card based on a trigger operation by the user on the guide information. Through the technical solution, the travel service card can be displayed on the display interface of the electronic device, so that the user can intuitively obtain trip information on the display interface, thereby preventing the user from missing the trip and improving the efficiency of travel reminding.

In an implementation, the generating and displaying a travel service card based on a trigger operation by the user on the guide information includes: if the trigger operation is a preset operation, determining the travel information corresponding to the first message; and generating and displaying the travel service card based on the travel information. Through the technical solution, the travel service card can be generated more accurately.

In a second aspect, an embodiment of this application provides an electronic device. The electronic device includes a memory and a processor. The memory is configured to store program instructions. The processor is configured to read the program instructions stored in the memory, so as to implement the service anomaly reminding method.

In a third aspect, an embodiment of this application provides a computer-readable storage medium, storing a computer-readable instructions, where the computer-readable instructions, when run by a processor, implement the service anomaly reminding method.

In addition, the technical effect brought by second aspect and the third aspect can be found in the related description of the method of each design of the foregoing method part, and details are not described herein again.

DESCRIPTION OF EMBODIMENTS

The terms "first" and "second" mentioned below are used merely for the purpose of description, and shall not be construed as indicating or implying relative importance or implying a quantity of indicated technical features. Therefore, a feature limited by "first" or "second" may explicitly or implicitly include one or more of the features. In the embodiments of this application, the terms, such as "exemplarily", "or", and "for example", are used to represent giving an example, an illustration or a description. Any embodiment or design solution described by using "exemplarily" or "for example" in the embodiments of this application should not be explained as being more preferred or having more advantages than another embodiment or design solution. Exactly, use of the term, such as "exemplarily", "or", and "for example", is intended to present a related concept in a specific manner.

Unless otherwise defined, meanings of all technical and scientific terms used in this specification are the same as those usually understood by a person skilled in the art to which this application belongs. Terms used in the specification of this application are merely intended to describe objectives of the specific embodiments, but are not intended to limit this application. It should be understood that in this application, "/" means "or" unless otherwise specified. For example, A/B may represent A or B. In this application, "and/or" describes only an association relationship for describing associated objects and indicates that three relationships may exist. For example, A and/or B may represent: the following three cases: only A exists, both A and B exist, and only B exists. "At least one" means one or more. "A plurality of" means two or more. For example, at least one of a, b, or c may represent: the following seven cases: a; b; c; a and b; a and c; b and c; and a, b and c. It should be understood that the order of the steps shown in the flowcharts herein may be changed and some may be omitted.

Figure 1:
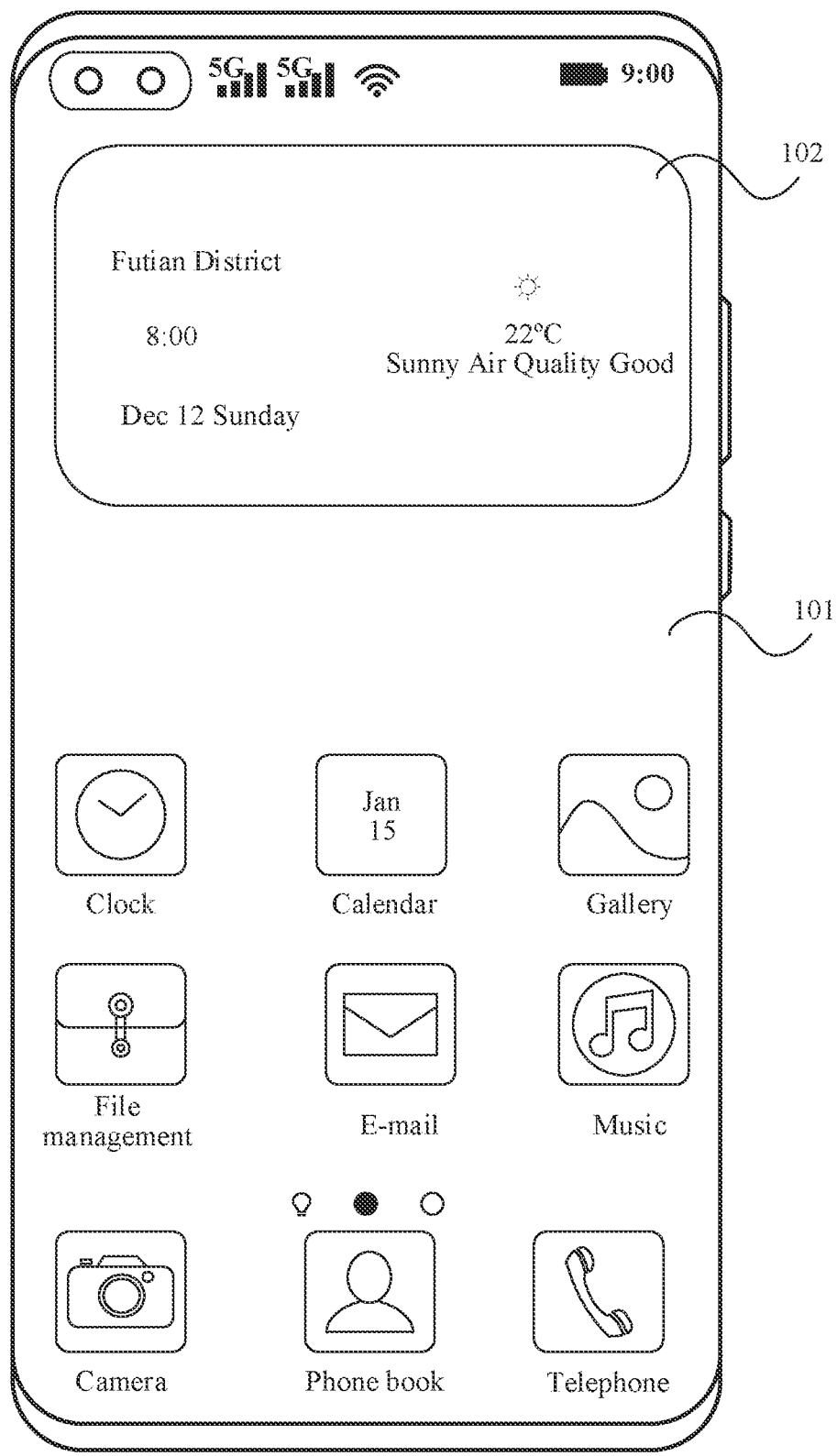
FIG. 1 is a schematic diagram of a weather card according to an embodiment of this application.

The scenario intelligent service of an electronic device has become a good helper for people's daily life schedule, which greatly facilitates the use by users. The scenario intelligent service of an electronic device has become a good helper for people's daily life schedule, which greatly facilitates the use by users. Through the scenario intelligent service, corresponding desktop cards (desktop widgets), such as a weather card, a travel service card, and a meeting record card, can be automatically generated by identifying a ticket booking message such as a flight or a train corresponding to a user of the electronic device, weather, a meeting, and a birthday record, and the generated desktop cards are collectively displayed on a display interface of the electronic device, so as to facilitate quick browsing and management by the user. The display interface includes, but is not limited to, a home screen interface and a leftmost home screen interface. The desktop cards are also known as desktop widgets. The desktop cards can be grouped into two categories: a control category and a view category. The size of the desktop card can be selected and set. Desktop cards of different sizes have no essential difference, but only show the difference in the amount of content displayed. Based on the displayed desktop card, the user may learn about a schedule, an express delivery dynamic status, weather and road conditions, and the like in real time. For example, FIG. 1 shows a schematic diagram of a weather card, and a desktop card (the weather card) 102 is displayed on a display interface 101 of an electronic device. If the electronic device generates a plurality of desktop cards, the electronic device may generate a desktop card set and display the plurality of desktop cards in a stacked manner.

In an embodiment, through the scenario intelligent service, when a ticket booking notification message of a flight, a train, or the like corresponding to a user of the electronic device is identified, a corresponding travel service card is generated. In addition, through the scenario intelligent service, the generated travel service card is displayed in an area where a desktop card is to be displayed, so that the user learns about the schedule in real time. However, when some electronic devices do not display a desktop card on a display interface by default and the user has difficulties in conveniently finding a card addition entrance, the travel service card cannot be normally displayed on the area where a desktop card is to be displayed, which causes that the user cannot enjoy the scenario intelligent service in a travel process. For example, if a travel service is abnormal (for example, an aircraft flight is canceled or delayed), the user may not be able to obtain changes in relevant travel information in a timely manner, which causes that a personal itinerary cannot be adjusted in a timely manner. In addition, if the user mistakenly deletes a desktop card on the display interface of the electronic device and the user has difficulties in conveniently re-adding the desktop card on the display interface, the travel service card cannot be normally displayed on the area where a desktop card is to be displayed.

To solve the above problem that the user cannot enjoy the scenario intelligent service in a travel process caused by that the travel service card cannot be normally displayed on the electronic device due to that the desktop card is not displayed on the display interface of the electronic device, this embodiment of this application provides a service anomaly reminding method, which can remind the user when the scenario intelligent service is abnormal in the travel process, so that the user adjusts the scenario intelligent service in a timely manner and that the travel service card is normally displayed on the electronic device, thereby improving the timeliness of travel reminding.

The solution provided in the embodiments of this application is described below in detail with reference to the accompanying drawings.

The service anomaly reminding method provided in the embodiments of this application can be applied to an electronic device having a display interface. The electronic device may be a mobile phone, a tablet computer, a desktop computer, a laptop computer, a handheld computer, a laptop, an ultra-mobile personal computer (UMPC), a netbook, a cellular phone, a personal digital assistant (PDA), an artificial intelligence (AI) device, a wearable device, a vehicle-mounted device, a smart home device, and/or a smart city device, and other electronic devices having display interfaces. A specific form of the device is not particularly limited in the embodiments of this application.

Figure 2:
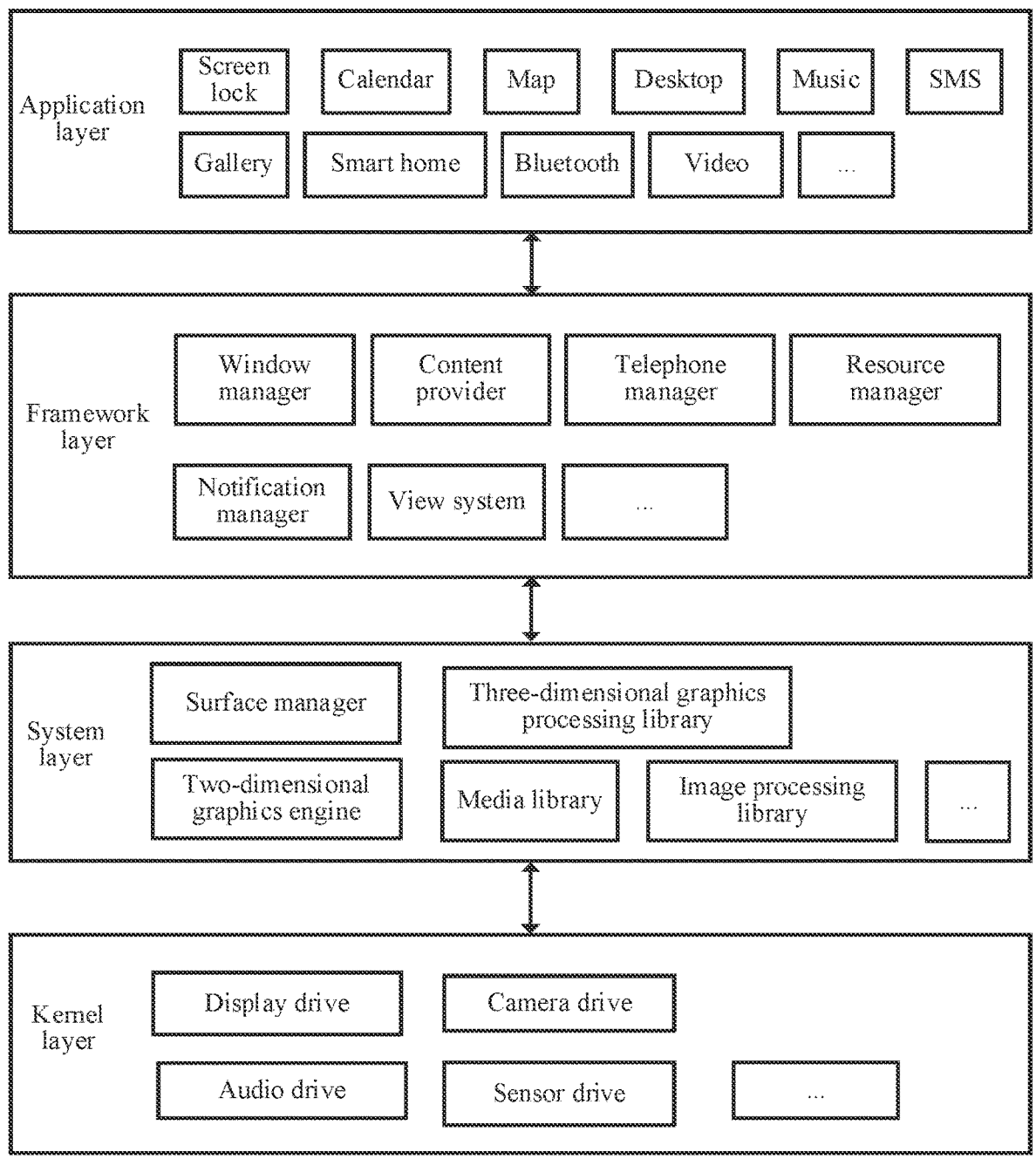
FIG. 2 is a software structural block diagram of an electronic device according to an embodiment of this application.

FIG. 2 is a software structural block diagram of an electronic device according to an embodiment of this application. In the hierarchical architecture, software is divided into several layers, and each layer has a clear role and task. The layers communicate with each other through a software interface. In some embodiments, the software system is divided into four layers, from top to bottom, which are an application layer, a framework layer, a system library, and a kernel layer.

The application layer may include a series of application packages. For example, the application program may include an application such as a lock screen, a gallery, a calendar, a call, a map, a navigation, a desktop, Bluetooth, music, a video, an SMS, and an intelligent service. The desktop application is configured to display guide information and/or a desktop card on a display interface of the electronic device. The display interface may include a home screen, a leftside home screen, a leftmost home screen, a lock screen, and the like. An intelligent service application may provide an intelligent service for a user of the electronic device, such as a travel reminder, or a weather reminder. For example, the intelligent service application may automatically generate a corresponding desktop card (desktop widget) such as a weather card, a travel service card, or a meeting record card by identifying booking information such as a flight, a train, or the like corresponding to a user of the electronic device.

The framework layer provides an application programming interface (API) and a programming framework for the applications at the application layer. The application framework layer includes some predefined functions. For example, the application framework layer may include a window manager, a content provider, a view system, a telephone manager, a resource manager, a notification manager, a view system, and the like.

The window manager may obtain a size of a display, determine whether there is a status bar, perform screen locking, take a screenshot of the screen, and the like. In some implementations of this application, whether a desktop card exists on a display interface of the electronic device may be determined by using a window manager. The content provider is configured to store and obtain data and make the data accessible to an application. The data may include a video, an image, an audio, calls that are made and answered, a browsing history and a bookmark, a phonebook, and the like. The view system includes visual controls such as a control for displaying a text and a control for display an image. The phone manager is configured to provide a communication function of the electronic device, The resource manager provides various resources for an application, for example, a localized character string, an icon, a picture, a layout file, and a video file. The notification manager enables an application to display notification information on the status bar.

The application layer and the framework layer run on a virtual machine. The virtual machine executes java files of the application layer and the framework layer as binary files. The virtual machine is used to execute functions such as object lifecycle management, stack management, thread management, security and anomaly management, and garbage collection. The system library may include a plurality of function modules, such as a surface manager, a media library (Media Libraries), a three-dimensional graphics processing library (for example, an OpenGL ES), a two-dimensional graphics engine (for example, an SGL), and an image processing library.

The kernel layer is a layer between hardware and software. The kernel layer includes at least a display drive, a camera drive, an audio drive, and a sensor drive. It may be understood that the layers in the software structure shown in FIG. 2 and the components included in each layer do not constitute a specific limitation on the electronic device. In some other embodiments of this application, the electronic device may include more or less layers than those shown in the figure, and each layer may include more or less components, which is not limited in this application.

Figure 3A:
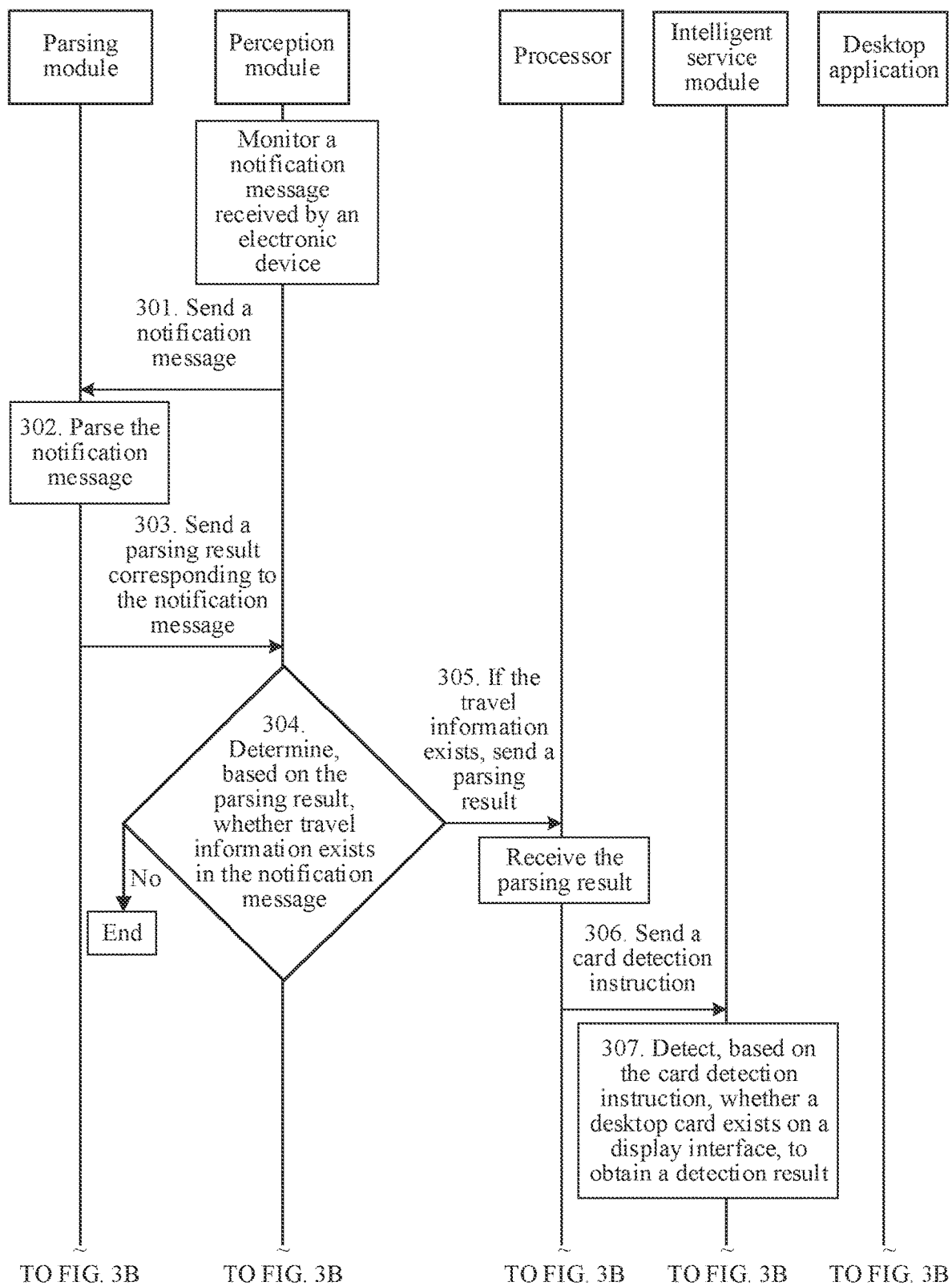
FIG. 3A and FIG. 3B are schematic flowcharts of a service anomaly reminding method according to an embodiment of this application.
Figure 3B:
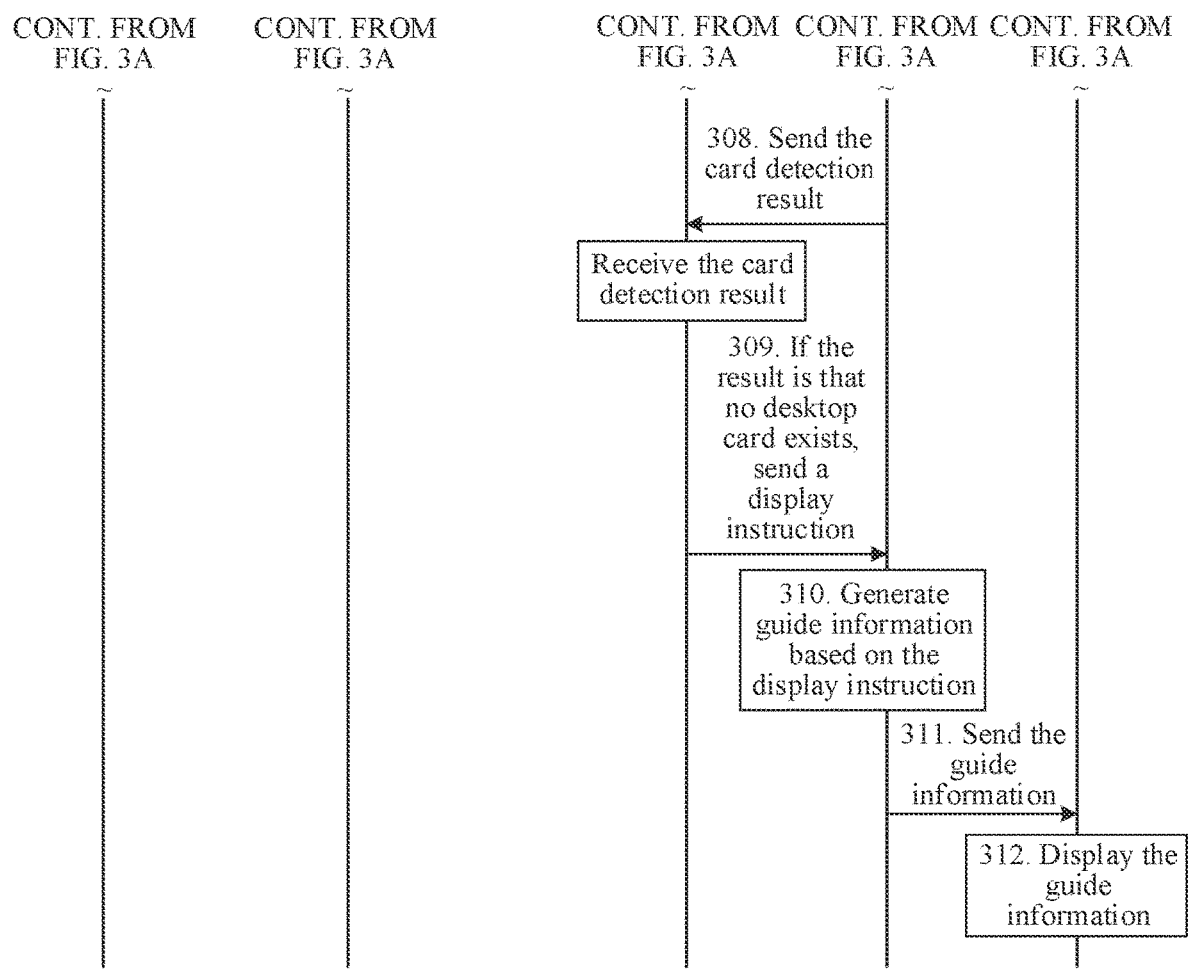

FIG. 3A and FIG. 3B are schematic flowcharts of a service anomaly reminding method according to an embodiment of this application; The service anomaly reminding method is applicable to an electronic device, and the electronic device may include modules such as a perception module, a parsing module, a processor, an intelligent service module, and a desktop application. The perception module is configured to monitor a first message received by the electronic device and receive a parsing result of the first message from the parsing module, to determine whether the first message includes travel-related content, such as travel information. If the first message includes the travel information, the perception module sends the parsing result corresponding to the first message to the processor. The processor is configured to control the intelligent service module to perform a corresponding action. The intelligent service module is configured to provide an intelligent service for a user of the electronic device. The desktop application is configured to control content displayed on a display interface of the electronic device, for example, controlling a desktop card displayed on the display interface of the electronic device.

As shown in FIG. 3A and FIG. 3B, the method may include:

301: Send a notification message.

The perception module is configured to monitor a first message received on the electronic device. The first message may include a notification message. The notification message is a message received by the electronic device, and may include reminding information (for example, system update prompt information, power amount reminding information, and memory reminding information) from the electronic device to the user, received short message information (for example, short message information sent by an operator, short message information sent by another electronic device, and the like), or push information sent by an application in the electronic device. The perception module may be a system application, and for the user, the system application is invisible. The perception module may be started autonomously when the electronic device is initialized. It may be understood that the foregoing described notification message is merely used as an example for description, and there may be other notification messages, which is not limited herein. The first message may further include a communication message sent through chat software and/or a message pushed by an official account or an applet. For example, after being authorized by the user, the perception module may further monitor a communication message received through chat software, or may monitor a message pushed by an official account or an applet.

If the perception module monitors the notification message, the perception module sends the monitored notification message to the parsing module, so that the parsing module parses the notification message. The parsing module is controlled to parse the notification message. The parsing module may parse content in the notification message to determine a message type and/or message content of the notification message. The parsing module may be a functional program package.

302: Parse the notification message.

The parsing module parses the notification message to obtain a parsing result corresponding to the notification message. The parsing result may include a message type and message content.

303: Send a parsing result corresponding to the notification message.

The parsing module sends the parsing result corresponding to the notification message to the perception module.

304: Determine, based on the parsing result, whether travel information exists in the notification message.

In some embodiments of this application, the perception module determines, based on the parsing result, whether the notification message triggers a travel information fence. If the notification message triggers the travel information fence, it is determined that the travel information exists in the notification message. The travel information fence is used for monitoring travel information, and the travel information is travel-related information. Whether the travel information exists in the notification message may be determined based on a triggering result of the travel information fence. If the travel information fence is triggered, it is determined that the travel information exists in the notification message. If the travel information fence is not triggered, it is determined that the travel information does not exist in the notification message.

The notification message may be identified based on the parsing result, to determine whether the travel information exists in the notification message. In some other embodiments of this application, the perception module may determine, based on the message type of the notification message in the parsing result, whether the travel information exists in the notification message. For example, if the message type of the notification message is a preset travel type, it is determined that a travel notification message exists in the notification message. Content of the travel type may be set based on an actual situation, such as a booking notification message and a flight change notification message, which is not limited herein. Content in a message can be accurately identified based on a type of the message, and determining whether the message includes travel information can be effectively improved.

If it is determined, based on the parsing result, that the travel information exists in the notification message, a subsequent service anomaly reminding step is performed (for example, step 305 is performed). If it is determined, based on the parsing result, that no travel information exists in the notification message, the process ends.

305: If the travel information exists, send a parsing result.

The perception module sends the parsing result to the processor. The processor is configured to make decisions on some tasks.

306: Send a card detection instruction.

After receiving the parsing result, the processor sends the card detection instruction to the intelligent service module. The card detection instruction is used for controlling the intelligent service module to detect whether a desktop card exists on a current display interface of the electronic device. The intelligent service module is configured to provide an intelligent service for a user of the electronic device, and may be an intelligent assistant, such as the YOYO suggestion.

307: Detect, based on the card detection instruction, whether a desktop card exists on a display interface, to obtain a card detection result.

The intelligent service module detects, based on the received card detection instruction, whether the desktop card exists on a current display interface of the electronic device, to obtain the card detection result. The display interface includes, but is not limited to, a home screen interface and a leftmost home screen interface.

308: Send the card detection result.

The intelligent service module sends the card detection result to the processor.

309: If the card detection result is that no desktop card exists on the display interface, send a display instruction.

The processor receives the card detection result and determines content corresponding to the card detection result.

If the card detection result is that no desktop card exists on the display interface, the processor determines that the travel service card cannot be normally displayed on the electronic device, the user cannot normally enjoy the scenario intelligent service in a travel process, and the current service is abnormal. Exemplarily, if the card detection result is that no desktop card exists on the display interface, the processor sends, to the intelligent service module, a display instruction used for instructing the intelligent service module to generate guide information. The display instruction may carry the guide information, and the guide information is used for instructing the user to add a desktop card, such as a travel service card, on the display interface of the electronic device.

If the card detection result is that the desktop card exists on the display interface, the processor may end the process. Alternatively, the processor may control the intelligent service module to update, based on the parsing result corresponding to the notification message, the desktop card displayed on the current display interface. The updated desktop card may include the parsing result corresponding to the notification message, for example, including the travel information that exists in the notification message. By updating the desktop card based on the travel information included in the notification message, the real-time performance of the card can be ensured, so that the user can obtain more accurate travel information and that a better scenario intelligent service experience in the travel process is brought about to the user, thereby improving the efficiency of travel reminding.

310: Generate guide information based on the display instruction.

The intelligent service module generates the guide information based on the received display instruction.

311: Send the guide information.

The intelligent service module sends the guide information to the desktop application and controls the desktop application to display the guide information.

312: Display the guide information.

The desktop application receives and displays the guide information.

The desktop application may display the guide information in a plurality of display manners. The guide information may be displayed by using a card on the display interface. For example, the guide information is displayed through a card on a leftmost home screen, the guide information is displayed through a card on a home screen, the guide information may be displayed in a status bar of the electronic device, or the guide information may be displayed by pushing a notification message. For example, the guide information is displayed in a notification message bar of the electronic device, or the guide information is displayed on a lock screen interface of the electronic device. The size of the card may be set based on an actual situation, which is not limited herein. The intelligent service module may alternatively display the guide information in a voice prompt manner. The manner of displaying the guide information is not listed one by one in this application.

Figure 4:
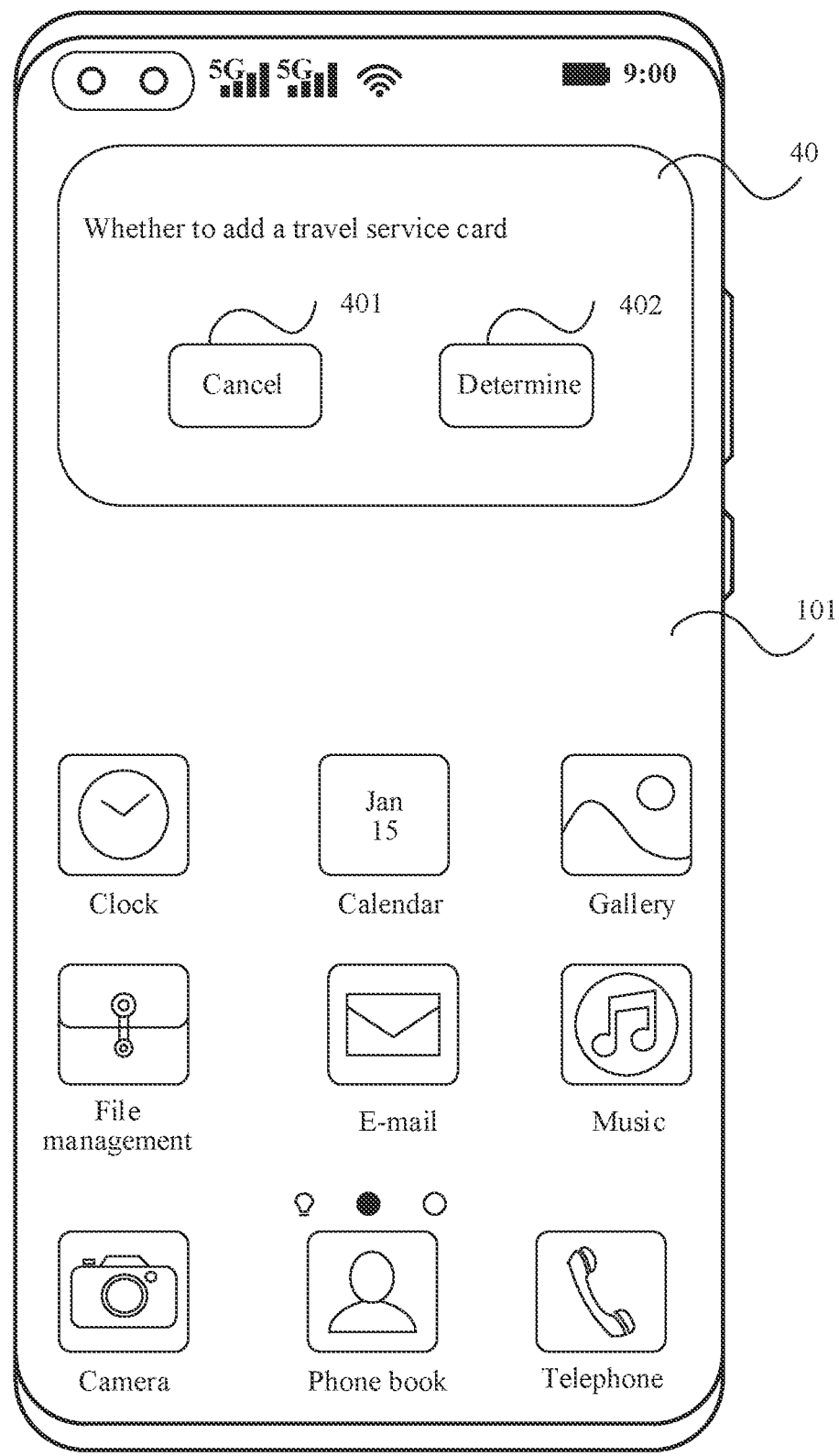
FIG. 4 is a schematic diagram of a scenario of displaying guide information according to an embodiment of this application.

For example, FIG. 4 is a schematic diagram of a scenario of displaying guide information according to an embodiment of this application. In FIG. 4, guide information 40 on a display interface 101 includes a control 401 (a control for canceling addition of a card) and a control 402 (a control for determining adding of a card). If the intelligent service module receives a click/tap operation by a user on the control 402, the desktop application is controlled to add a travel service card on the display interface.

After the user adds the desktop card on the display interface based on the instruction of the guide information, the service anomaly problem of the scenario intelligent service is solved. Moreover, the travel service card may be displayed on the electronic device, so that the user can smoothly enjoy the scenario intelligent service in the travel process, thereby improving the efficiency of travel reminding.

Figure 5:
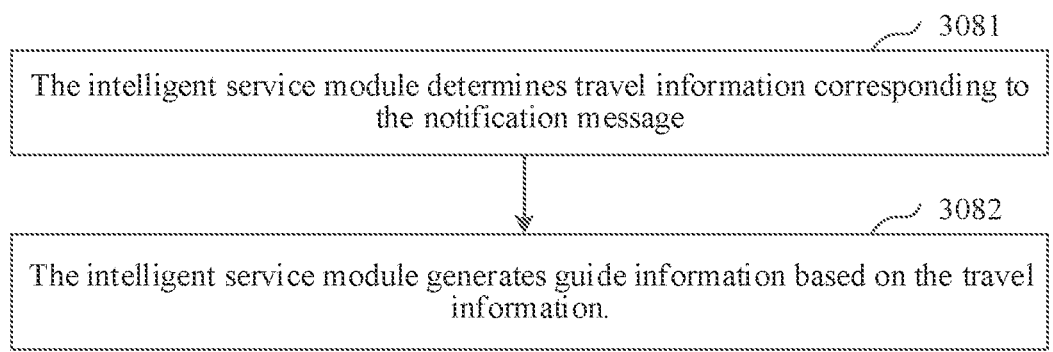
FIG. 5 is a sub-flowchart of a step in the method of FIG. 2.

In some embodiments of this application, as shown in FIG. 5, 38 in FIG. 3B may specifically include:

3081: The intelligent service module determines travel information corresponding to the notification message.

The travel information may include a traveler, a travel time, a travel shift, and the like.

Exemplarily, the intelligent service module may determine the travel information corresponding to the notification message by obtaining the parsing result of the notification message. Alternatively, the intelligent service module may determine the travel information corresponding to the notification message through data exchange with a sender of the notification message. The sender may include a travel application, for example, an application such as the railway 12306®, the ZhiXingtTainTickets®, the Fliggytravel®, or the TravelGo®.

3082: The intelligent service module generates guide information based on the travel information.

After generating the guide information, the intelligent service module sends the guide information to a desktop application and controls the desktop application to display the guide information.

Figure 6:
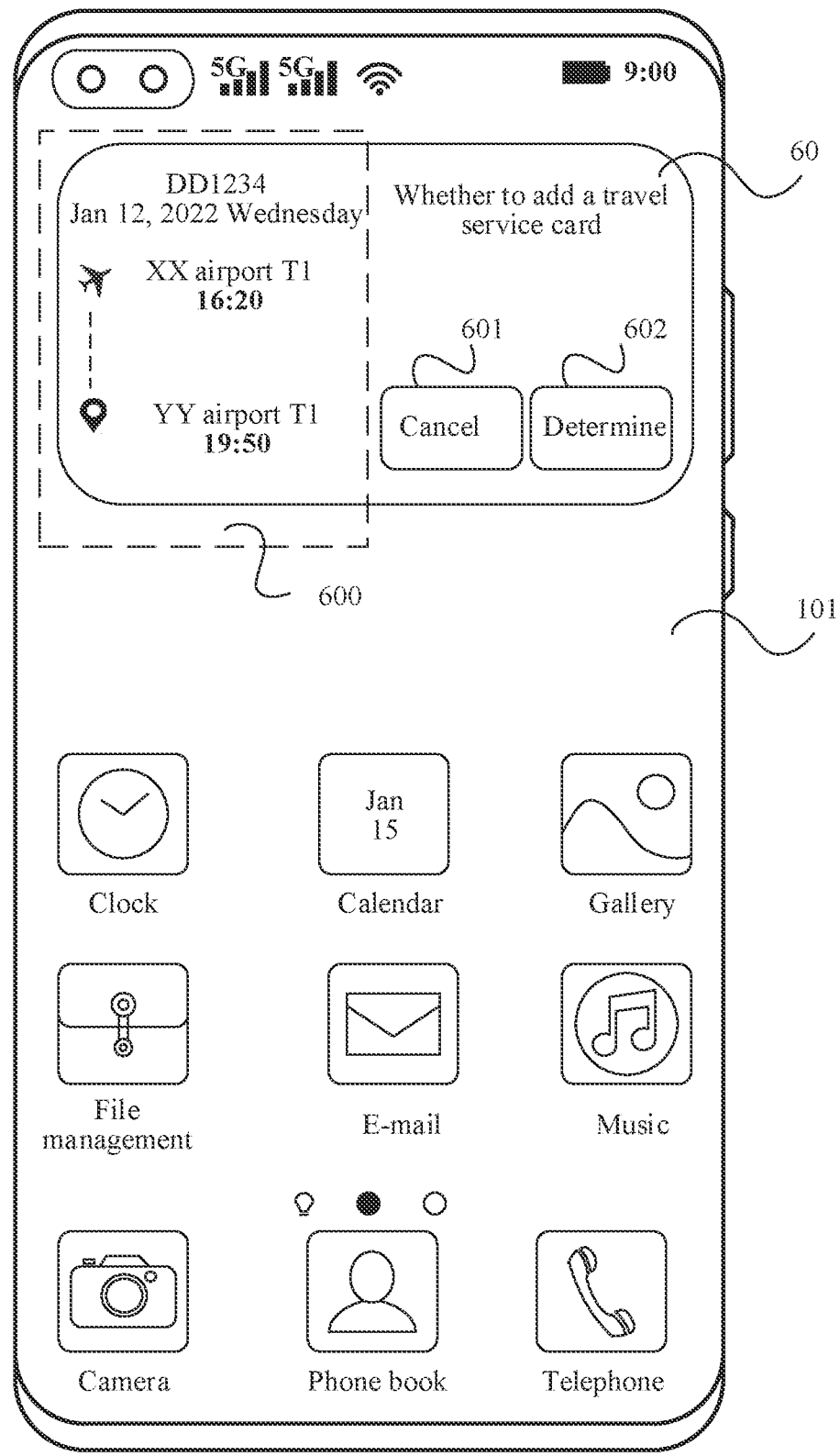
FIG. 6 is a schematic diagram of a scenario of displaying guide information according to an embodiment of this application.

The guide information includes the travel information, so that the user can intuitively experience the content and benefits of the scenario intelligent service in a travel process, thereby improving the efficiency of service anomaly reminding. For example, FIG. 6 is a schematic diagram of another scenario of guide information. Guide information 60 on a display interface 101 shown in FIG. 6 includes travel information 600, a control 601 (a control for canceling adding of a card), and a control 602 (a control for determining adding of a card).

In some implementations of this application, if the card detection result is that no desktop card exists on the display interface, the processor sends the display instruction and the parsing result corresponding to the notification message to the intelligent service module. The intelligent service module determines the travel information corresponding to the notification message based on the parsing result, and generates guide information based on the display instruction and the travel information.

The generated guide information includes the corresponding content of the travel information, so that the user can intuitively experience the content of the scenario intelligent service in the travel process, thereby improving the efficiency of the service anomaly reminding. The generated guide information may be shown in FIG. 6.

Figure 7:
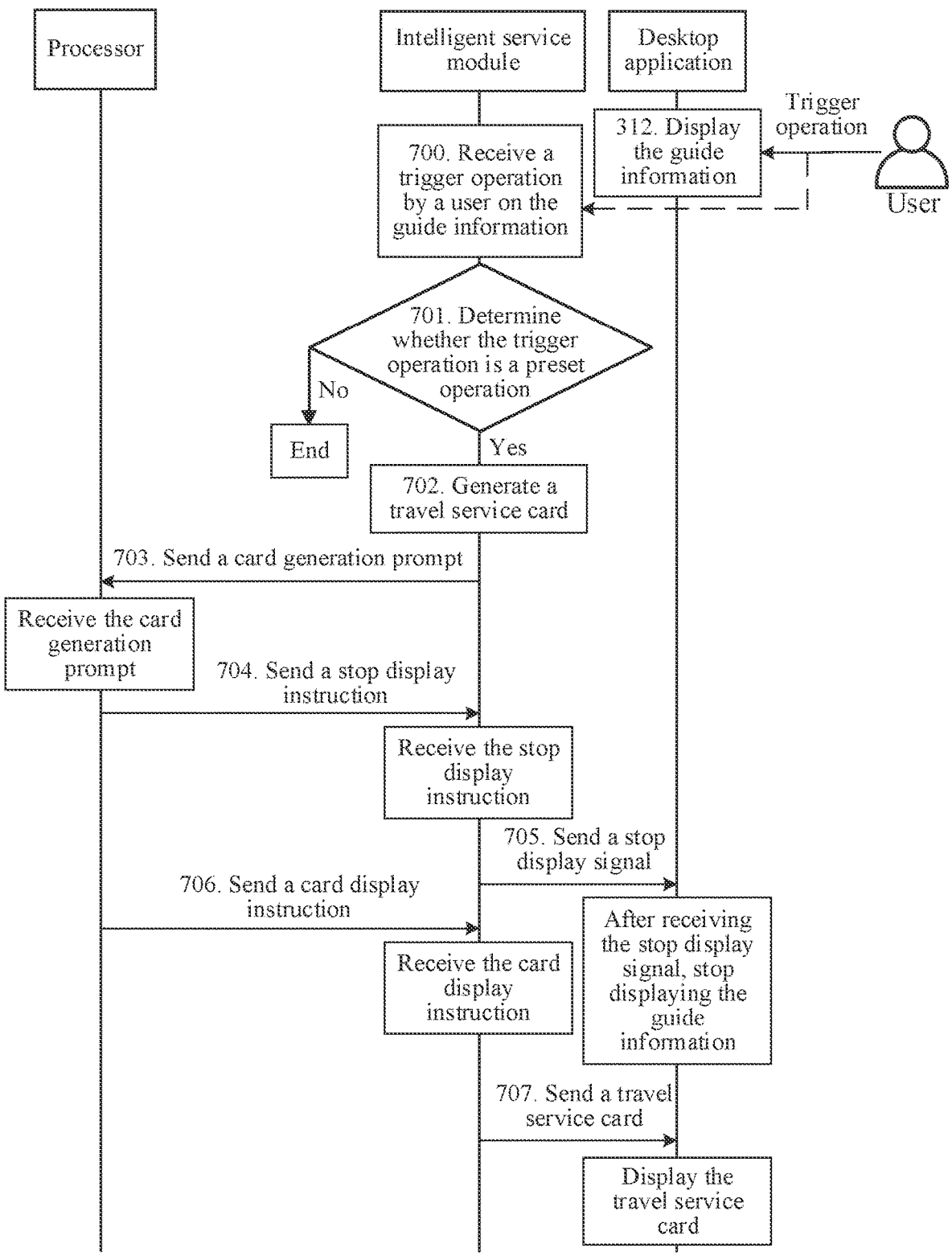
FIG. 7 is a flowchart of displaying a travel service card according to an embodiment of this application.

In some embodiments of this application, as shown in FIG. 7, after 312 in FIG. 3A and FIG. 3B, the method may include:

700: Receive a trigger operation by a user on the guide information.

The intelligent service module receives the trigger operation by the user on the guide information.

In some embodiments of this application, after the desktop application displays the guide information, the intelligent service module may monitor a trigger operation by the user on the guide information, so as to obtain the trigger operation by the user on the guide information. Alternatively, after the desktop application displays the guide information, the processor controls a module to monitor a trigger operation by the user on the guide information, and sends a monitored trigger operation to the intelligent service module, where the module may be a perception module. Here, this application does not limit how the intelligent service module receives the trigger operation by the user on the guide information.

701: Determine whether the trigger operation is a preset operation.

The intelligent service module determines whether the trigger operation is the preset operation. The preset operation serves as a corresponding operation on a consent display card. For example, an operation such as tapping the control 402 in FIG. 4 or tapping the control 602 in FIG. 6 serves as the preset operation.

If the intelligent service module determines that the trigger operation is not the preset operation, the process ends.

If the intelligent service module determines that the trigger operation is the preset operation, 702 is performed.

702: Generate a travel service card.

The intelligent service module generates a travel service card. The travel service card includes travel information.

Content of the travel service card may be determined based on a parsing result of the notification message, or may be determined through data exchange with the sender of the notification message. The process of how to generate the travel service card is not limited herein.

703: Send a card generation prompt.

The intelligent service module sends a card generation prompt to the processor.

704: Send a stop display instruction.

After receiving the card generation prompt, the processor sends the stop display instruction to the intelligent service module, so as to instruct the display interface of the electronic device to stop displaying the guide information.

705: Send a stop display signal.

After the intelligent service module receives the stop display indication, the intelligent service module sends the stop display signal to the desktop application, to control the desktop application to stop displaying the guide information. Exemplarily, if the guide information is displayed in a form of a card, after the desktop application stops displaying the guide information, the card disappears from the display interface of the electronic device.

706: Send a card display instruction.

The processor sends the card display instruction to the intelligent service module, to instruct to display the travel service card on the display interface of the electronic device.

707: Send a travel service card.

After the intelligent service module receives the card display instruction, the intelligent service module sends the travel service card to the desktop application, so that the travel service card is displayed on the display interface of the electronic device. In some embodiments of this application, the desktop application may control the travel service card to be displayed on a home screen interface, may control the travel service card to be displayed on a leftmost home screen interface, or may control the travel service card to be displayed on a status bar interface. In the embodiments of this application, a display position of the travel service card is not limited herein.

After the intelligent service module displays the travel service card, the user can intuitively obtain trip information on the display interface, thereby preventing the user from missing the trip and improving the efficiency of travel reminding.

It may be understood that the steps described in FIG. 7 are merely illustrative, and do not constitute any limitation. The execution order of the steps in FIG. 7 may be adjusted or deleted. For example, the execution order of 704 and 706 can be reversed, or 704 and 706 may be executed at the same time.

Figure 8:
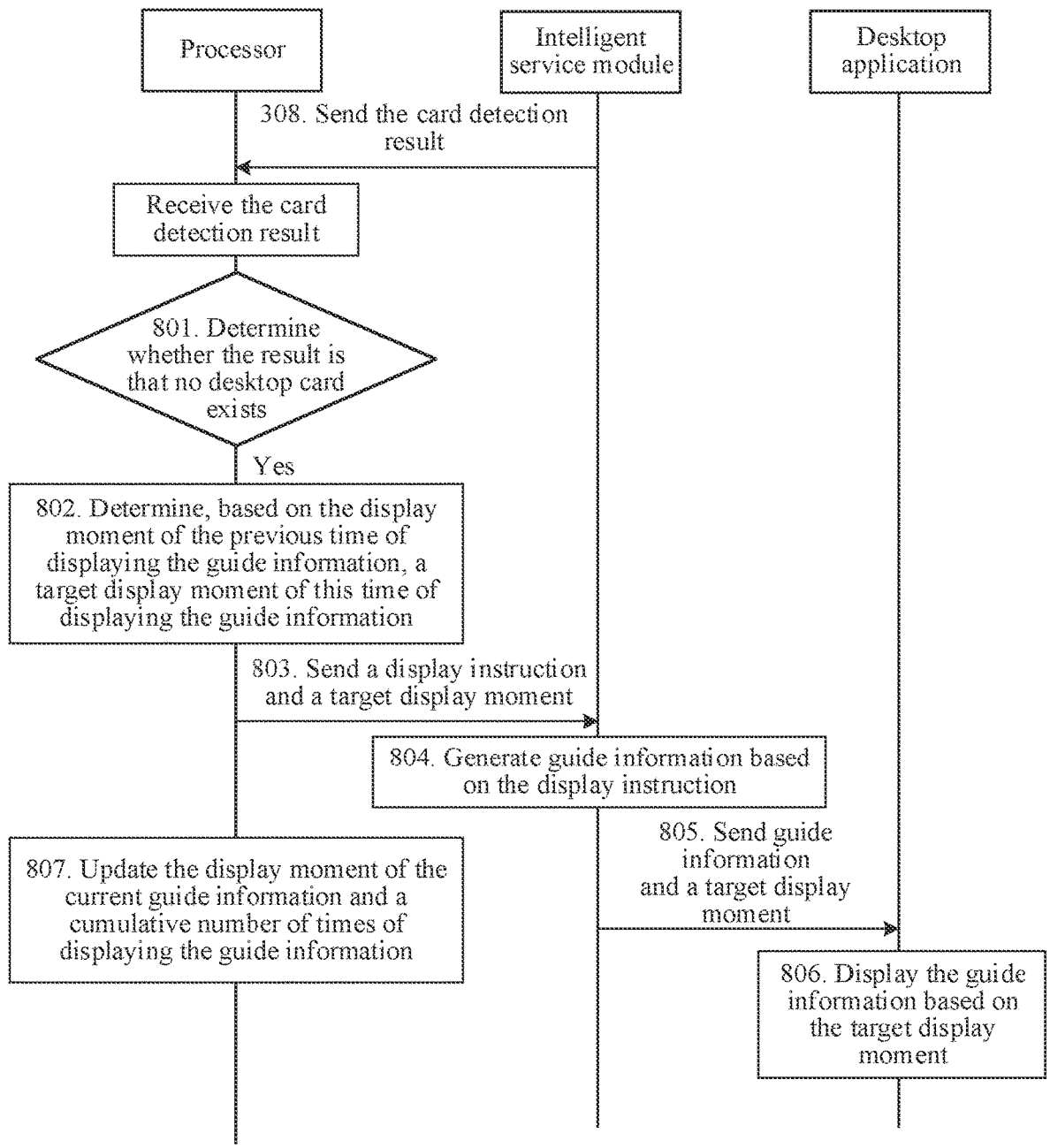
FIG. 8 is a flowchart of displaying guide information according to an embodiment of this application.

In some embodiments of this application, as shown in FIG. 8, after 308 in FIG. 3B is performed, the method may further include:

801: Determine whether the card detection result is that no desktop card exists.

The processor receives the card detection result and determines whether the card detection result is that no desktop card exists on the display interface of the electronic device.

If the card detection result is that no desktop card on the display interface, the process may ends. Alternatively, the processor may control the intelligent service module to update, based on the parsing result corresponding to the notification message, the desktop card displayed on the current display interface. The updated desktop card may include the parsing result corresponding to the notification message, for example, including the travel information that exists in the notification message. By updating the desktop card based on the travel information included in the notification message, the real-time performance of the card can be ensured, so that the user can obtain more accurate travel information and that a better scenario intelligent service experience in the travel process is brought about to the user, thereby improving the efficiency of travel reminding.

If the card detection result is that no desktop card exists on display interface, the processor executes step 802.

802: Determine, based on the display moment of the previous time of displaying the guide information, a display moment of this time of displaying the guide information.

If the card detection result is that no desktop card exists on the display interface, the processor obtains the display moment of the previous time of displaying the guide information. Exemplarily, the processor stores the display moment of the previous time of displaying the guide information. The previous time of displaying the guide information may also be used for indicating a moment when the user performs the trigger operation on the guide information.

The processor determines, based on the display moment of the previous time of displaying the guide information, a target display moment of this time of displaying the guide information.

Exemplarily, the processor may set a display moment interval in advance. The processor determines a moment obtained by adding the display moment of the previous time of displaying the guide information and the display moment interval as the target display moment of this time of displaying the guide information. If the moment obtained by adding the display moment of the previous time of displaying the guide information and the display moment interval is earlier than a current moment, the current moment is determined as the target display moment of this time of displaying the guide information.

In some implementations of this application, the processor determines, based on the display moment of the previous time of displaying the guide information and the cumulative number of times of displaying the guide information, the target display moment of this time of displaying the guide information.

Exemplarily, the processor stores the cumulative number of times of displaying the guide information.

The processor may determine, based on the cumulative number of times, a preset interval duration between two successive times of displaying the guide information. In this example, the preset interval duration may increase as the cumulative number of times increases, so as to avoid frequent disturbance to the user.

For example, preset interval duration may be equal to the cumulative number of times*L. For example, L is equal to 24 hours. For example, a first preset interval duration=1*24 h, that is, the preset interval duration between the first display moment and the second display moment is 24 hours; and a second preset interval duration=2*24 h, that is, the preset interval duration between the second display moment and the third display moment is 48 hours. Optionally, the preset interval duration may alternatively be stored in advance. For example, the first preset interval duration (that is, an interval between the first display moment and the second display moment) may be set to 24 hours, the second preset interval duration (that is, an interval between the second display moment and the third display moment) may be set to 72 hours, and a third preset interval duration (that is, an interval between the third display moment and the fourth display moment) may be set to 168 hours. The preset interval duration increases along with an increase in the cumulative number of times, so that the number of times of displaying the guide information is reduced, thereby further alleviating frequent disturbance to the user.

After a preset interval duration is determined, whether the duration from the previous time of displaying the guide information exceeds the preset interval duration is detected, and if the duration exceeds the preset interval duration, it is determined that the moment of this time of displaying the guide information is the current moment. For example, if the cumulative number of times is 1, it is determined that the preset interval duration is 24 hours, the target display moment of the previous time of displaying the guide information is T1, the current moment is T2, and T2−T1 it is greater than 24 hours, it may be determined that the target display moment of this time of displaying the guide information is T2.

If the preset interval duration does not expires, the moment of this time of displaying the guide information is determined based on the preset interval duration and the moment of the previous time of displaying the guide information. For example, if the cumulative number of times is 2, it is determined that the preset interval duration is 48 hours, the moment of the previous time of displaying the guide information is T1, the current moment is T2, and T2−T1 it is less than 48 hours, it may be determined that the moment of this time of displaying the guide information is T1+48.

After determining the moment of this time of displaying the guide information, the processor may send the display instruction to the intelligent service module based on the moment of this time of displaying the guide information, that is, 803 is performed.

803: Send a display instruction and a target display moment.

The processor sends the display instruction and the target display moment to the intelligent service module, so as to instruct the display interface of the control electronic device to display the guide information.

In some implementations, when the processor sends the display instruction for instructing the intelligent service module to display the guide information, the processor sends the parsing result to the intelligent service module, so that the intelligent service module generates the guide information based on the parsing result and the display instruction.

805: Send guide information and the target display moment.

The intelligent service module sends the guide information and the target display moment to the desktop application, and controls the desktop application to display the guide information based on the target display moment.

806: Display the guide information based on the target display moment.

The desktop application displays the guide information based on the target display moment.

807: Update the display moment of the current guide information and a cumulative number of times of displaying the guide information.

After the desktop application controls the display interface of the electronic device to display the guide information, the processor may update the display moment of the current guide information and the cumulative number of times of displaying the guide information.

Exemplarily, the moment of displaying the guide information stored by the processor is updated to the moment of this time of displaying the guide information. In some implementations of this application, the processor updates the cumulative number of times of displaying the guide information, for example, adding one to the cumulative number of times. For example, the stored moment of the previous time of displaying the guide information is recorded as Th=T1, the cumulative number of times N=1, and if the determined moment of this time of displaying the guide information is T2, Th is set to T2, that is, Th=T2, and the cumulative number of times N=2.

In this example, by recording the display moment of the previous time of displaying the guide information and the cumulative number of times of displaying the guide information, a preset interval duration can be determined, to further determine the moment of this time of displaying the guide information, thereby avoiding disturbance to the user caused by frequent displaying of the guide information.

For some specific implementations of 801-806 in FIG. 8, reference may be made to related descriptions of 310-312 in FIG. 3B, and details are not described herein again.

In the foregoing embodiments, the moment of this time of displaying the guide information is determined by using the moment of the previous time of displaying the guide information, thereby avoiding disturbance to the user caused by frequent displaying of the guide information.

Figure 9:
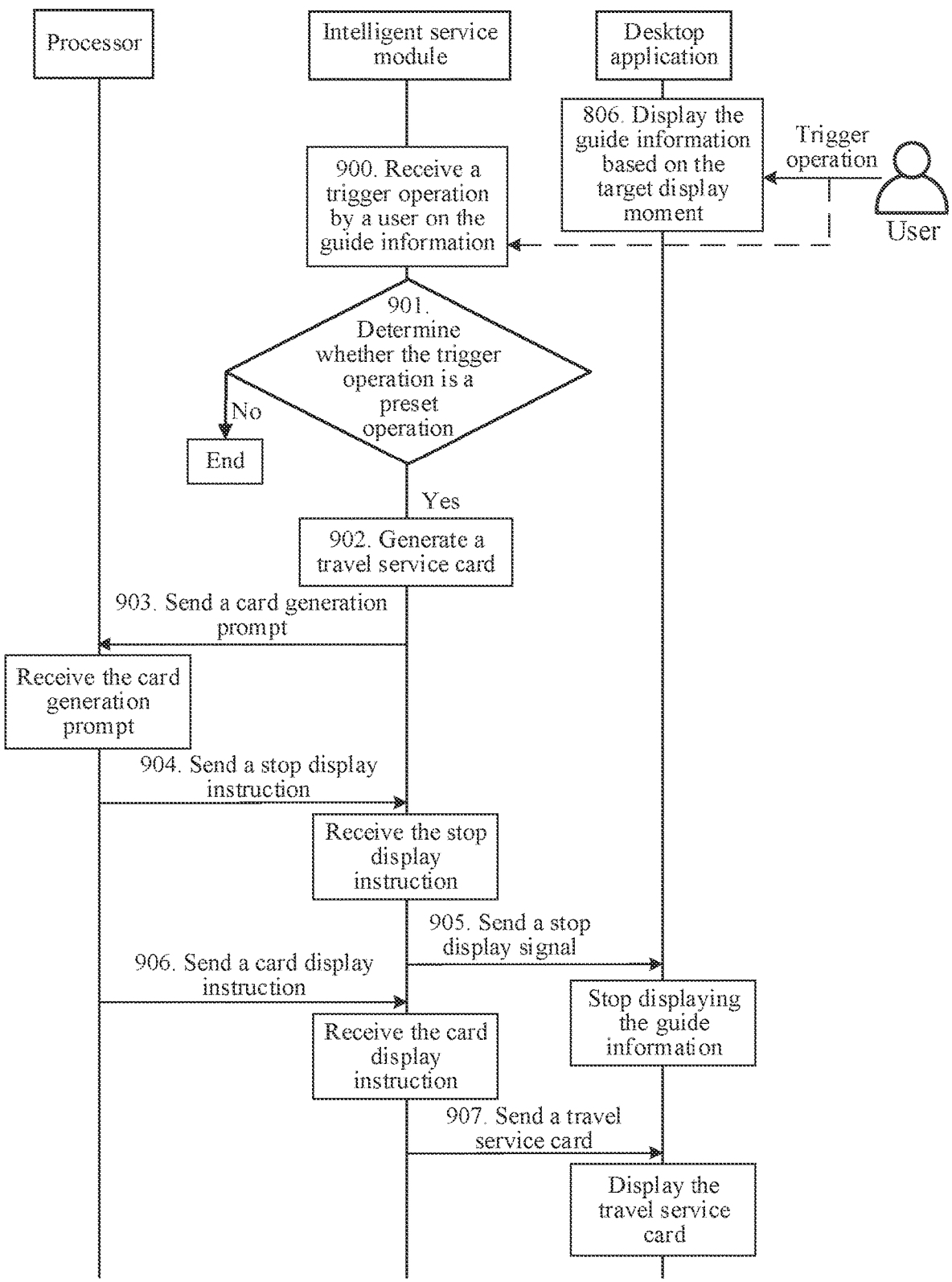
FIG. 9 is a flowchart of displaying a travel service card according to an embodiment of this application.

In some embodiments of this application, as shown in FIG. 9, after 806 in FIG. 8 is performed, the method may further include:

900: Receive a trigger operation by a user on the guide information.

The intelligent service module receives the trigger operation by the user on the guide information.

901: Determine whether the trigger operation is a preset operation.

The intelligent service module determines whether the trigger operation is the preset operation.

902: Generate a travel service card.

The intelligent service module generates a travel service card. The travel service card includes travel information.

903: Send a card generation prompt.

The intelligent service module sends a card generation prompt to the processor.

904: Send a stop display instruction.

After receiving the card generation prompt, the processor sends the stop display instruction to the intelligent service module, so as to instruct the display interface of the electronic device to stop displaying the guide information.

905: Send a stop display signal.

After the intelligent service module receives the stop display indication, the intelligent service module sends the stop display signal to the desktop application, to control the desktop application to stop displaying the guide information.

906: Send a card display instruction.

The processor sends the card display instruction to the intelligent service module, to instruct to display the travel service card on the display interface of the electronic device.

907: Send a travel service card.

After the intelligent service module receives the card display instruction, the intelligent service module sends the travel service card to the desktop application, so that the travel service card is displayed on the display interface of the electronic device.

For some specific implementations of 900-907, reference may be made to related descriptions of 700-707 in FIG. 7, and details are not described herein again.

After the intelligent service module displays the travel service card, the user can intuitively obtain trip information on the display interface, thereby preventing the user from missing the trip and improving the efficiency of travel reminding.

Figure 10:
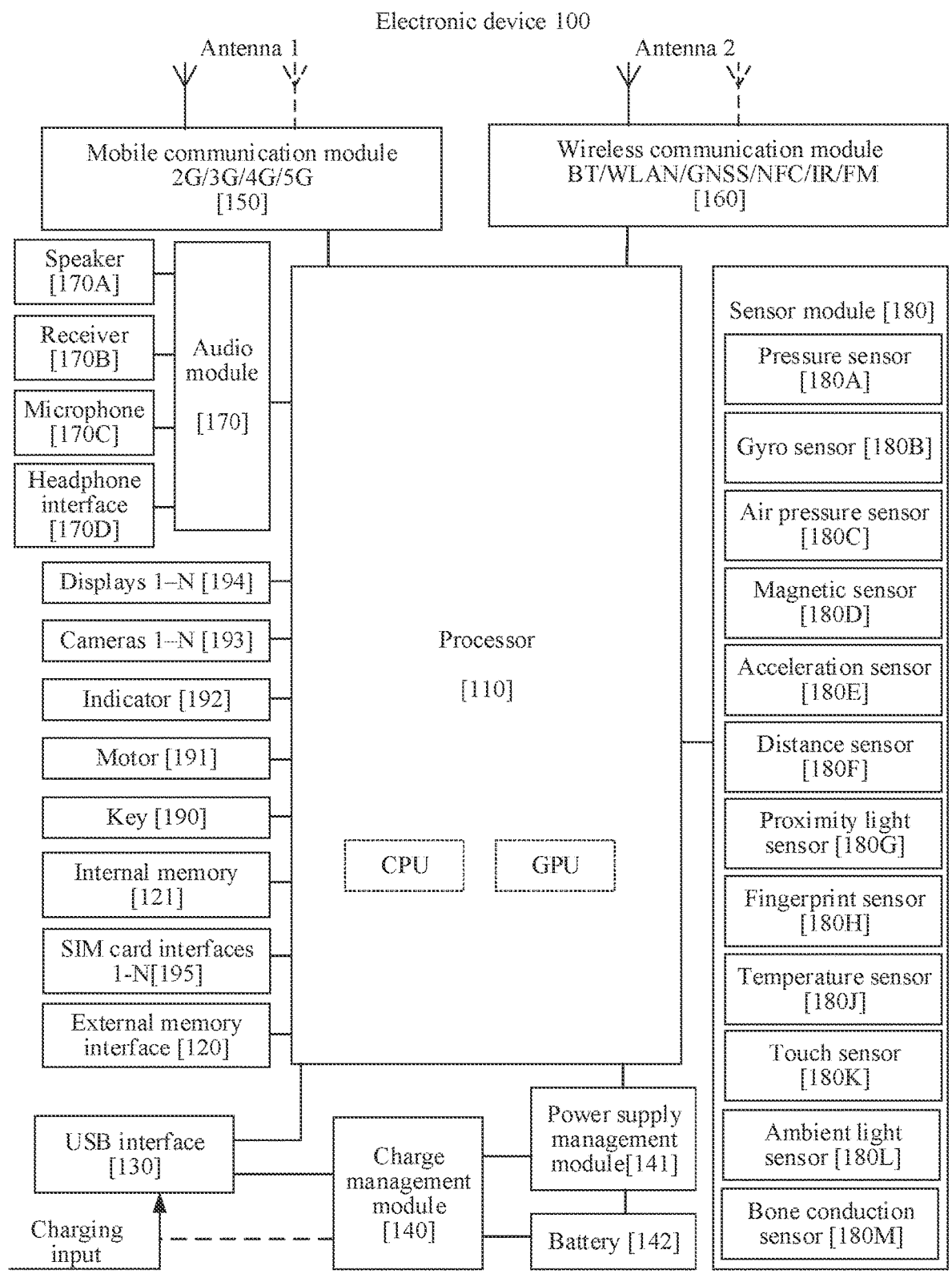
FIG. 10 is a schematic structural diagram of an electronic device according to an embodiment of this application.

FIG. 10 is a schematic structural diagram 100 of electronic device according to an embodiment of this application. Referring to FIG. 10, the electronic device 100 may include a processor 110, an external memory interface 120, an internal memory 121, a universal serial bus (USB) interface 130, a charging management module 120, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present disclosure does not constitute a specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a base-band processor, and/or a neural-network processing unit (NPU), and the like. In some embodiments of this application, the processor 110 may include a processor, where the processor is configured to control the intelligent service module to detect a desktop card on the display interface, and determine, based on a card detection result of the intelligent service module, whether to send, to the intelligent service module, a display instruction for displaying guide information. The display indication is used for instructing the intelligent service module to generate and display the guide information. The guide information is used for instructing the user to add a desktop card (travel service card) on the display interface of the electronic device.

A memory may also be disposed in the processor 110, configured to store instructions and data. In some embodiments, the memory in the processor 110 is a cache memory. The memory may store instructions or data recently used or cyclically used by the processor 110. If the processor 110 needs to use the instructions or the data again, the processor may directly call the instructions or the data from the memory, Repeated access is avoided, and waiting time of the processor 110 is reduced, thereby improving the system efficiency.

In some embodiments, the processor 110 may include one or more interfaces. The interface may include an integrated circuit (e.g., inter-integrated circuit (I2C)) interface, an integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, and the like.

An I1C interface is a bidirectional synchronous serial bus and includes a serial data line (SDA) and a serial clock line (SCL). The I2S interface may be configured to perform audio communication.

The PCM interface may also be configured to perform audio communication, to sample, quantize, and encode an analog signal. In some embodiments, the audio module 170 may be coupled to the wireless communication module 160 through a PCM bus interface.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function.

The MIPI may be configured to connect the processor 110 to a peripheral device such as the display 194 or the camera 193. The MIPI includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display 194 by using the DSI interface, to implement a display function of the electronic device 100.

A GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may also be configured as an I1C interface, an I2S interface, a UART interface, a MIPI, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the electronic device 100, or may be used for data transmission between the electronic device 100 and the peripheral device, The USB interface 130 may also be configured to connect to a headset to play audio through the headset. The interface may also be used for connecting to another electronic device 100, such as an AR device.

It may be understood that an interface connection relationship between the modules illustrated in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from the charger. The charger may be a wireless charger or a wired charger.

The power supply management module 141 is configured to be connected to the battery 142, the charging management module 140, and the processor 110. The power supply management module 141 receives an input of the battery 142 and/or the charging management module 140, to supply power to the processor 110, the internal memory 121, a display 194, the camera 193, the wireless communication module 160, and the like. The power supply management module 141 may also be configured to monitor parameters such as a battery capacity, a quantity of battery cycles, and a battery health status (power leakage and impedance).

A wireless communication function of the electronic device 100 may be implemented by using the antenna 1, the antenna 2, the mobile communication module 150, the wireless communication module 160, the modem processor, the base-band processor, and the like.

The antenna 1 and the antenna 2 are configured to transmit and receive an electromagnetic wave signal. Each antenna of the electronic device 100 may be configured to cover one or more communication frequency bands. Different antennas may further be multiplexed to improve the utilization of the antennas. For example, the antenna 1 may be multiplexed into a diversity antenna of a wireless local area network. In some other embodiments, the antennas may be used with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the received electromagnetic wave, and send the electromagnetic wave to the modem processor for demodulation. The mobile communication module 150 may further amplify a signal modulated by the modem processor, and convert the signal into an electromagnetic wave by using the antenna 1 for radiation.

The modulation and demodulation processor may include a modulator and a demodulator. The modulator is configured to modulate a low frequency base-band signal to be sent into a medium and high frequency signal. The demodulator is configured to demodulate the received electromagnetic wave signal into a low-frequency base-band signal. Then the demodulator transfers the low-frequency base-band signal obtained through demodulation to the base-band processor for processing. The low-frequency base-band signal is processed by the base-band processor and then transferred to an application processor. The application processor outputs a sound signal through an audio device (which is not limited to the speaker 170A, the telephone receiver 170B, and the like), or displays an image or a video through the display 194. In some embodiments, the modulation and demodulation processor may be an independent device. In some other embodiments, the modem processor may be independent of the processor 110, and is disposed in a same device as the mobile communication module 150 or another function module.

The wireless communication module 160 may provide a wireless communication solution such as a wireless local area network (WLAN), Bluetooth (BT), global navigation satellite system (GNSS), frequency modulation (FM), near field communication (NFC), or an infrared (IR) technology applied to the electronic device 100. The wireless communication module 160 may be one or more components into which at least one communication processing module is integrated. The wireless communication module 160 receives an electromagnetic wave by using the antenna 2, performs frequency modulation on and filters the electromagnetic wave signal, and sends a processed signal to the processor 110. The wireless communication module 160 may further receive a to-be-sent signal from the processor 110, perform frequency modulation on and amplify the to-be-sent signal, and convert the to-be-sent signal into an electromagnetic wave by using the antenna 2 for radiation.

The electronic device 100 implements a display function by using the GPU, the display 194, the application processor, and the like. The GPU is a microprocessor for service anomaly reminding and connects the display 194 and the application processor. The GPU is configured to perform mathematical and geometric calculations, and is configured to render graphics. The processor 110 may include one or more GPUs that execute a program instruction to generate or change display information.

The display 194 is configured to display an image, a video, and the like. The display 194 includes a display panel. The display panel may use a liquid crystal touchscreen (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), and the like.

In some embodiments, the electronic device 100 may include 1 or N displays 194. N is a positive integer greater than 1. The electronic device 100 may implement a photographing function by using the ISP, the camera 193, the video codec, the GPU, the display 194, the application processor, and the like.

The camera 193 is configured to capture a still image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into an image signal in standard RGB and YUV formats. In some embodiments, the electronic device 100 may include 1 or N cameras 193, and N is a positive integer greater than 1.

The digital signal processor is configured to process a digital signal, and in addition to a digital image signal, the digital signal processor may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG) 1, MPEG 2, MPEG 3, and MPEG 4.

The NPU is a neural-network (NN) computing processor, and quickly processes input information by using a biological neural network structure such as a mode of transmission between human-brain nerve cells, and may further constantly perform self-learning. The NPU may be used to implement an application such as intelligent cognition of the electronic device 100, for example, image recognition, facial recognition, voice recognition, and text understanding.

The internal memory 121 may include one or more random access memories (RAMs) and one or more non-volatile memories (NVMs). In this embodiment of this application, the internal memory 121 may also be referred to as a memory. In some embodiments, the processor (such as a CPU) may store, in the memory, a display moment of each time of displaying of the guide information and a cumulative number of times of displaying the guide information.

The external memory interface 120 may be configured to connect to an external non-volatile memory, to expand a storage capability of the electronic device 100. The external non-volatile memory communicates with the processor 110 by using the external memory interface 120, to implement a data storage function, for example storing a file such as a music or a video in the external non-volatile memory.

The electronic device 100 may implement an audio function by using the audio module 170, the speaker 170A, the telephone receiver 170B, the microphone 170C, the headset jack 170D, the application processor, and the like, for example, music playing or recording, or the like.

The audio module 170 is configured to convert digital audio information into analog audio signal output, and is also configured to convert analog audio input into a digital audio signal. The audio module 170 may further be configured to encode and decode audio signals.

The speaker 170A, also referred to as "horn", is configured to convert an electrical audio signal into a sound signal. Music may be listened to or a hands-free call may be answered by using the speaker 170A in the electronic device 100.

The telephone receiver 170B, also referred to as "handset", is configured to convert an electrical audio signal into a sound signal. When the electronic device 100 is configured to answer a call or receive voice information, the phone receiver 170B may be put close to a human ear to receive a voice.

The microphone 170C, also referred to as "voice tube" or "mike", is configured to convert a sound signal into an electrical signal. When making a call or sending voice information, a user may make a sound approaching the microphone 170C through the mouth of the user, to input a sound signal into the microphone 170C. At least one microphone 170C may be disposed in the electronic device 100. In some other embodiments, two microphones 170C may be disposed in the electronic device 100, to acquire a sound signal and implement a noise reduction function. In some other embodiments, three, four, or more microphones 170C may be alternatively disposed in the electronic device 100, to acquire a sound signal, implement noise reduction, recognize a sound source, implement a directional recording function, and the like.

The headset jack 170D is configured to be connected to a wired headset. The headset jack 170D may be a USB interface 130, or may be a 3.5 mm open mobile terminal 100 platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may be a parallel plate including at least two conductive materials. In a case that a force is applied onto the pressure sensor 180A, a capacitance between electrodes changes. The electronic device 100 determines pressure strength based on a change in the capacitance. When a touch operation is performed on the display 194, the electronic device 100 detects intensity of the touch operation based on the pressure sensor 180A. The electronic device 100 may also calculate a touch position based on a detection signal of the pressure sensor 180A. In some embodiments of this application, whether the user performs the trigger operation on the guide information may be determined based on a touch position of the user on the display interface. For example, if the touch position of the user on the display interface is a position corresponding to the control 402 in FIG. 3A and FIG. 3B, a position corresponding to the control 602 in FIG. 5, or a position corresponding to the control 802 in FIG. 7, the trigger operation performed by the user on the guide information is determined.

The gyroscope sensor 180B may be configured to determine a motion posture of the electronic device 100. In some embodiments, the desktop card displayed on the display interface may be updated through positioning of the gyroscope sensor 180B.

The air pressure sensor 180C is configured to measure an air pressure. In some embodiments, the electronic device 100 calculates an altitude by using a barometric pressure value measured by the barometric pressure sensor 180C, to assist in positioning and navigation.

A magnetic sensor 180D includes a Hall sensor. The electronic device 100 may detect an opening state or a closing state of a flip leather case by using the magnetic sensor 180D. In some embodiments, when the electronic device 100 is a clamshell phone, the electronic device 100 may detect opening and closing of a flip cover based on the magnetic sensor 180D. Further, features such as automatic unlocking of the flip cover are set based on the detected opening and closing states of the leather case or opening and closing states of the flip cover.

The acceleration sensor 180E may detect an acceleration value of the electronic device 100 in each direction (generally three axes). When the electronic device 100 is stationary, a magnitude and a direction of a gravity may be detected. The acceleration sensor may be further configured to recognize a posture of the electronic device 100, and is applied to switching between landscape orientation and portrait orientation, and applied to an application such as a pedometer.

The distance sensor 180F is configured to measure a distance. The electronic device 100 may measure a distance by infrared light or laser. In some embodiments, in a photographing scenario, the electronic device 100 may measure a distance by using the distance sensor 180F, to implement quick focusing.

The proximity light sensor 180G may include, for example, a light-emitting diode (LED) and a light detector, for example, a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100.

The ambient light sensor 180L is configured to perceive ambient light brightness. The electronic device 100 may adaptively adjust a luminance of the display 194 based on the perceived ambient light brightness. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to acquire a fingerprint. The electronic device 100 may implement fingerprint unlock, application lock accessing, fingerprint photographing, fingerprint-based call answering, and the like by using a feature of the acquired fingerprint.

The temperature sensor 180J is configured to detect temperature.

The touch sensor 180K is also referred to as a "touch device". The touch sensor 180K may be disposed on the display 194. The touch sensor 180K and the display 194 form a touchscreen, also referred to as a "touchscreen". The touch sensor 180K is configured to detect a touch operation on or near the touch sensor 180K. The touch sensor may transfer the detected touch operation to the application processor to determine a type of the touch event. The touch sensor 180K may provide a visual output related to the touch operation by using the display 194. In some other embodiments, the touch sensor 180K may alternatively be arranged on a surface of the electronic device 100 at a position different from that of the display 194.

The bone conduction sensor 180M may acquire a vibration signal. In some embodiments, the bone conduction sensor 180M may obtain a vibration signal of an acoustic portion vibrating bone of a human body. The bone conduction sensor 180M may also come into contact with a human pulse to receive a blood pressure pulse signal. In some embodiments, the bone conduction sensor 180M may also be disposed in the headset, to combine into a bone conduction headset. The audio module 170 may obtain a speech signal through parsing based on the vibration signal, of the vibration bone of the vocal-cord part, that is obtained by the bone conduction sensor 180M, to implement a speech function. The application processor may parse heart rate information based on the blood pressure beating signal obtained by the bone conduction sensor 180M, to implement a heart rate measurement function.

The button 190 includes a power button, a volume button, and the like. The button 190 may be a mechanical button, or a touch-type button. The electronic device 100 may receive a button input, and generate a button signal input related to user setting and function control of the electronic device 100.

The motor 191 may generate a vibration prompt. The motor 191 may be used for an incoming call vibration prompt and a touch vibration feedback. For example, touch operations performed on different applications (for example, photo taking and audio playing) may correspond to different vibration feedback effects. The motor 191 may also correspond to different vibration feedback effects for touch operations applied to different areas of the display 194. Different application scenarios (for example, a time reminder, information receiving, an alarm clock, and a game) may further correspond to different vibration feedback effects. Customization of a touch vibration feedback effect may also be supported.

The indicator 192 may be an indicator light that may be configured to indicate a charging state and a power change, or may be configured to indicate a message, a missed call, a notification, and the like.

The SIM card interface 195 is configured to connect a SIM card. The SIM card may be inserted into the SIM card interface 195 or plugged from the SIM card interface 195, to come into contact with or be separated from the electronic device 100. The electronic device 100 may support 1 or N SIM card interfaces, N being a positive integer greater than 1. The SIM card interface 195 can support a nano SIM card, a micro SIM card, a SIM card, and the like. A plurality of cards may be simultaneously inserted into the same SIM card interface 195. Types of the plurality of cards may be the same or different. The SIM card interface 195 may further be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

This embodiment further provides a computer storage medium. The computer storage medium stores computer instructions. The computer instructions, when run on an electronic device 100, cause the electronic device 100 to perform steps of the related method to implement the service anomaly reminding method in the foregoing embodiments.

This embodiment of this application further provides a computer program product. The computer program product, when run on a computer, causes the computer to perform the related steps, to implement the service anomaly reminding method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to cause the chip to perform the service anomaly reminding method in the foregoing method embodiments.

The electronic device, the computer storage medium, the computer program product, or the chip provided in this embodiment may be configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above.

In the several embodiments provided in this application, it should be understood that the disclosed apparatus and method may be implemented in other manners. For example, the described apparatus embodiment is merely exemplary. For example, the module or unit division is merely a logical function division and may be other division during actual implementations. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in multiple different places. Some or all of the units may be selected according to actual needs to achieve the objectives of the solutions of this embodiment.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of the present disclosure. The storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and essence of the technical solutions of this application.

What is claimed is:

1. A service anomaly reminding method, the method comprising:
   receiving, by an electronic device, a first message;
   parsing, by the electronic device, the first message to determine whether the first message comprises travel information;
   based on the first message comprising the travel information, determining, by the electronic device, whether a desktop card exists on a display interface of the electronic device;
   based on no desktop card existing on the display interface of the electronic device, displaying, by the electronic device, guide information, wherein the guide information comprises the travel information and a first control for determining adding of a card, wherein the displaying the guide information comprises:
      obtaining a display moment of a previous time of displaying the guide information;
      determining, based on the display moment of the previous time of displaying the guide information, a target display moment of this time of displaying the guide information, wherein the determining the target display moment of this time of displaying the guide information comprises: determining a cumulative number of times of displaying the guide information, and determining, based on the display moment of the previous time of displaying the guide information and the cumulative number of times of displaying the guide information, the target display moment of this time of displaying the guide information; and
      displaying the guide information based on the target display moment; and
   based on a trigger operation by a user on the first control, stopping, by the electronic device, displaying the guide information, and generating and displaying, by the electronic device, a travel service card.

2. The method according to claim 1, wherein the parsing the first message to determine whether the first message comprises travel information comprises:
   parsing the first message to determine a message type of the first message; and
   determining, based on the message type, whether the first message comprises the travel information.

3. The method according to claim 1, wherein based on no desktop card existing on the display interface of the electronic device, before displaying the guide information, the method further comprises:
   based on no desktop card existing on the display interface of the electronic device, generating the guide information.

4. The method according to claim 3, wherein the generating the guide information comprises:
   based on no desktop card existing on the display interface of the electronic device, determining travel information corresponding to the first message; and
   generating the guide information based on the travel information.

5. The method according to claim 4, wherein the determining the travel information corresponding to the first message comprises:

parsing the first message to determine the travel information corresponding to the first message.

6. The method according to claim 4, wherein the determining the travel information corresponding to the first message comprises:
determining a sender corresponding to the first message; and
performing data exchange with the sender to determine the travel information corresponding to the first message.

7. The method according to claim 1, wherein after determining the target display moment of this time of displaying the guide information, the method further comprises:
recording the display moment of this time of displaying the guide information, and updating the cumulative number of times of displaying the guide information.

8. An electronic device, comprising:
a processor; and
a memory configured to store code instructions, and when the processor executes the code instructions, the electronic device performs operations comprising:
receiving a first message;
parsing the first message to determine whether the first message comprises travel information;
based on the first message comprising the travel information, determining whether a desktop card exists on a display interface of the electronic device;
based on no desktop card existing on the display interface of the electronic device, displaying guide information, wherein the guide information comprises the travel information and a first control for determining adding of a card, wherein the displaying the guide information comprises:
obtaining a display moment of a previous time of displaying the guide information;
determining, based on the display moment of the previous time of displaying the guide information, a target display moment of this time of displaying the guide information, wherein the determining the target display moment of this time of displaying the guide information comprises: determining a cumulative number of times of displaying the guide information, and determining, based on the display moment of the previous time of displaying the guide information and the cumulative number of times of displaying the guide information, the target display moment of this time of displaying the guide information; and
displaying the guide information based on the target display moment; and
based on a trigger operation by a user on the first control, stopping displaying the guide information, and generating and displaying a travel service card.

9. The electronic device according to claim 8, wherein the parsing the first message to determine whether the first message comprises travel information comprises:
parsing the first message to determine a message type of the first message; and
determining, based on the message type, whether the first message comprises the travel information.

10. The electronic device according to claim 8, wherein based on no desktop card existing on the display interface of the electronic device, before displaying the guide information, the electronic device further performs operations comprising:
based on no desktop card existing on the display interface of the electronic device, generating the guide information.

11. The electronic device according to claim 10, wherein the generating the guide information comprises:
based on no desktop card existing on the display interface of the electronic device, determining travel information corresponding to the first message; and
generating the guide information based on the travel information.

12. The electronic device according to claim 11, wherein the determining the travel information corresponding to the first message comprises:
parsing the first message to determine the travel information corresponding to the first message.

13. The electronic device according to claim 11, wherein the determining the travel information corresponding to the first message comprises:
determining a sender corresponding to the first message; and
performing data exchange with the sender to determine the travel information corresponding to the first message.

14. The electronic device according to claim 8, wherein after determining the target display moment of this time of displaying the guide information, the electronic device further performs operations comprising:
recording the display moment of this time of displaying the guide information, and updating the cumulative number of times of displaying the guide information.

15. The electronic device according to claim 8, wherein the generating and displaying the travel service card comprises:
based on the trigger operation being a preset operation, determining the travel information corresponding to the first message; and
generating and displaying the travel service card based on the travel information.

16. A non-transitory computer-readable storage medium, wherein the computer-readable storage medium stores instructions, and the instructions, when executed, cause an electronic device to perform operations comprising:
receiving a first message;
parsing the first message to determine whether the first message comprises travel information;
based on the first message comprising the travel information, determining whether a desktop card exists on a display interface of the electronic device;
based on no desktop card existing on the display interface of the electronic device, displaying guide information, wherein the guide information comprises the travel information and a first control for determining adding of a card, wherein the displaying the guide information comprises:
obtaining a display moment of a previous time of displaying the guide information;
determining, based on the display moment of the previous time of displaying the guide information, a target display moment of this time of displaying the guide information, wherein the determining the target display moment of this time of displaying the guide information comprises: determining a cumulative number of times of displaying the guide information, and determining, based on the display moment of the previous time of displaying the guide information and the cumulative number of times of displaying the guide information, the target display moment of this time of displaying the guide information; and displaying the guide information based on the target display moment; and based on a trigger operation by a user on the first control, stopping displaying the guide information, and generating and displaying a travel service card.

* * * * *